(12) United States Patent
Yanagisawa et al.

(10) Patent No.: US 10,428,187 B2
(45) Date of Patent: Oct. 1, 2019

(54) METHOD FOR PRODUCING MIXTURE

(71) Applicant: BRIDGESTONE CORPORATION, Tokyo (JP)

(72) Inventors: Yasuto Yanagisawa, Tokyo (JP); Yukari Kanda, Tokyo (JP); Shigenobu Waragai, Tokyo (JP); Osamaru Matsuo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/559,141

(22) PCT Filed: Mar. 18, 2016

(86) PCT No.: PCT/JP2016/058842
§ 371 (c)(1),
(2) Date: Sep. 18, 2017

(87) PCT Pub. No.: WO2016/148299
PCT Pub. Date: Sep. 22, 2016

(65) Prior Publication Data
US 2018/0079873 A1 Mar. 22, 2018

(30) Foreign Application Priority Data
Mar. 19, 2015 (JP) .................. 2015-056561

(51) Int. Cl.
C08J 3/215 (2006.01)
C08J 3/22 (2006.01)
C08J 3/205 (2006.01)
C08K 3/04 (2006.01)

(52) U.S. Cl.
CPC .............. *C08J 3/215* (2013.01); *C08J 3/205* (2013.01); *C08J 3/22* (2013.01); *C08J 2307/00* (2013.01); *C08J 2309/00* (2013.01); *C08J 2309/06* (2013.01); *C08K 3/04* (2013.01)

(58) Field of Classification Search
CPC .............. C08J 3/205; C08J 3/215; C08J 3/22
USPC ................ 523/318, 351; 425/197–209
See application file for complete search history.

(56) References Cited

U.S. PATENT DOCUMENTS

| | | | |
|---|---|---|---|
| 6,040,364 A | 3/2000 | Mabry et al. | |
| 6,048,923 A | 4/2000 | Mabry et al. | |
| 6,075,084 A | 6/2000 | Mabry et al. | |
| 6,365,663 B2 | 4/2002 | Mabry et al. | |
| 6,413,478 B1 | 7/2002 | Mabry et al. | |
| 6,521,691 B1 | 2/2003 | Agostini et al. | |
| 6,841,606 B2 | 1/2005 | Yanagisawa et al. | |
| 7,105,595 B2 | 9/2006 | Mabry et al. | |
| 7,252,920 B2 | 8/2007 | Kurokawa et al. | |
| 7,582,688 B2 | 9/2009 | Mabry et al. | |
| 8,586,651 B2 | 11/2013 | Wang et al. | |
| 9,238,724 B2 | 1/2016 | Wang et al. | |
| 9,796,819 B2 * | 10/2017 | Nishiura | C08J 3/22 |
| 2002/0016404 A1 | 2/2002 | Mabry et al. | |
| 2003/0088006 A1 | 5/2003 | Yanagisawa et al. | |
| 2003/0195276 A1 | 10/2003 | Mabry et al. | |
| 2003/0203992 A1 | 10/2003 | Mabry et al. | |
| 2006/0111475 A1 | 5/2006 | Mabry et al. | |
| 2006/0205867 A1 | 9/2006 | Yanagisawa et al. | |
| 2010/0311898 A1 | 12/2010 | Yamada et al. | |
| 2011/0021664 A1 | 1/2011 | Wang et al. | |
| 2014/0045989 A1 | 2/2014 | Wang et al. | |

FOREIGN PATENT DOCUMENTS

| | | | |
|---|---|---|---|
| JP | 2736975 | B2 | 4/1998 |
| JP | 2004-99625 | A | 4/2004 |
| JP | 2006-219593 | A | 8/2006 |
| JP | 2008-013704 | A | 1/2008 |
| JP | 2008-230074 | A | 10/2008 |
| JP | 2008-297428 | A | 12/2008 |
| JP | 2009-41026 | A | 2/2009 |
| JP | 2009186573 | A | 8/2009 |
| JP | 2010-65126 | A | 3/2010 |
| JP | 2010270200 | A | 12/2010 |
| JP | 2011-016874 | A | 1/2011 |
| JP | 2011-032373 | A | 2/2011 |
| JP | 2011-511148 | A | 4/2011 |
| JP | 2016-037547 | A | 3/2016 |
| WO | 9825186 | A1 | 6/1998 |
| WO | 2005/012396 | A1 | 2/2005 |
| WO | 2009/072413 | A1 | 6/2009 |
| WO | 2015/170540 | A1 | 11/2015 |

OTHER PUBLICATIONS

International Preliminary Report on Patentability with a Translation of Written Opinion issued from the International Bureau in counterpart International Application No. PCT/JP2016/058842, dated Sep. 28, 2017.
International Search Report for PCT/JP2016/058842 dated Jun. 21, 2016.
Emulsifier Disperser Milder MDN; Matsubo; Copyright, 2007-2018; Printed on Jan. 9, 2019; Matsubo Corporation.

* cited by examiner

*Primary Examiner* — Edward J Cain
(74) *Attorney, Agent, or Firm* — Sughrue Mion, PLLC

(57) ABSTRACT

Provided is a method for producing a mixture, comprising a mixing step for mixing a slurry prepared by dispersing a filler containing carbon black and a rubber liquid prepared by dispersing or the like a rubber component. In the above producing method, the carbon black contained in the slurry has a surface average acidic functional group amount (μeq/m$^2$) of 0.40 or more and less than 3.00; a pH of the slurry is 8 or more; the sum total of the solid matter concentrations of the slurry and the rubber liquid is 20% by mass or less; a mixing equipment used has one or more rotors disposed rotatably in a rotation axis direction and one or more stators disposed unrotatably in the rotation axis direction; the rotors and the stators have plural projections which are arranged circularly with the rotation axis set as the center; rings are formed concentrically by the projections in a single stage or a multistage; and the slurry and the rubber liquid are allowed to pass through a space between the rotors and the stators while the rotors rotate, whereby the mixing is carried out to produce the mixture.

4 Claims, 3 Drawing Sheets

METHOD FOR PRODUCING MIXTURE

CROSS REFERENCE TO RELATED APPLICATIONS

This application is a National Stage of International Application No. PCT/JP2016/058842 filed Mar. 18, 2016, claiming priority based on Japanese Patent Application No. 2015-056561 filed Mar. 19, 2015, the contents of all of which are incorporated herein by reference in their entirety.

TECHNICAL FIELD

The present invention relates to a method for producing a mixture such as a wet master batch containing carbon black.

BACKGROUND ART

It has so far been known that in producing a rubber composition containing a filler such as carbon black and the like in the field of rubber production, a wet master batch is used in order to enhance a processability of the rubber composition and a dispersibility of the filler.

A wet master batch is produced generally by passing through an optional rubber latex solution preparation step for adding optionally a surfactant, water and the like to a latex of a natural rubber and a synthetic rubber to prepare a rubber latex solution, a filler slurry preparation step for dispersing a filler such as carbon black and the like in a solvent such as water to prepare a slurry solution, a mixing and coagulating step for continuously mixing and coagulating the rubber latex solution and the filler slurry which are prepared in the above steps to form a coagulated liquid containing a coagulated matter, a solid-liquid separating step for separating and taking out only the coagulated matter from the coagulated liquid formed, a washing step for washing the coagulated matter separated to remove impurities such as the coagulant and the like adhered thereon or contained therein from the coagulated matter, a dehydrating step for removing a moisture remaining in an inside vacant of the coagulated matter washed, a drying step for drying the coagulated matter dehydrated, and an optional molding step for molding the coagulated matter dried into a desired form such as a particular form, a sheet form and the like to form the wet master batch of the product.

When using a wet master batch, it is characterized by that obtained is a rubber composition which is excellent in a dispersibility of a filler and excellent in rubber properties such as a processability and a reinforcing property as compared with conventional rubber compositions obtained by mixing components in a solid state. Use of a rubber composition prepared by using a wet master batch for raw material makes it possible to produce, for example, rubber products such as tires which are reduced in a rolling resistance and are excellent in a fatigue resistance and an abrasion resistance.

On the other hand, in producing the wet master batch, the filler has to be sufficiently dispersed in the stage of the wet master batch in order to enhance the physical properties of the final vulcanized rubber. The step requiring dispersion has so far been extended over two stages, and the dispersion is secured via a mixing step and a kneading step (biaxial extruding step). However, the desirable equipment is to achieve the dispersion only by the kneading step.

In the light of an excellent dispersibility as compared with a rubber composition prepared by mixing components in a solid state, it is important that carbon black and a rubber latex solution are sufficiently mixed in the stage of a mixing and coagulating step for mixing and coagulating a latex and a carbon slurry.

A method for enhancing the physical properties of the final vulcanized rubber by optimizing a particle size distribution of carbon black taking note of a dispersion state of a carbon black slurry solution which is a raw material is reported as a method for sufficiently mixing carbon black and a rubber latex solution.

Known are, for example, 1) a method for producing a wet master batch, comprising a step for mixing a slurry solution prepared by dispersing a filler such as carbon black in advance in water with a natural rubber latex, wherein a particle size distribution of the filler in the slurry solution is controlled to 30 µm or less in terms of a 90 volume % particle diameter (D90) (refer to, for example, a patent document 1), and 2) a natural rubber wet master batch composition obtained by, for example, a producing method in which a slurry solution prepared by dispersing carbon black in advance in water is allowed to collide with a natural rubber latex at a high pressure to mix them (refer to, for example, a patent document 2).

Given is a method in which an optional mixer is used to carry out kneading and dehydrating while heating a filler-containing rubber coagulated matter in the methods for producing a rubber wet master batch in the patent documents 1 and 2 described above. In the above kneading and dehydrating method, the more the mechanical energy in kneading is elevated, the more the dispersibility of the rubber wet master batch obtained after dehydration can be enhanced.

However, if a heat quantity and/or a mechanical energy applied in dehydration are increased, caused is the problem that a polymer molecular chain of the resulting rubber wet master batch is broken to deteriorate the rubber characteristics of the rubber composition finally obtained in a certain case.

On the other hand, known as a method for producing a rubber wet master batch other than the methods described above are, for example, 3) a method for producing a rubber chemical-containing master batch, characterized by drying and kneading a rubber wet master batch containing a rubber component and a filler by means of a biaxial extruder which is a first kneader and then further mixing it with a rubber chemical by means of a Banbury mixer which is a second kneader (refer to, for example, a patent document 3), and 4) a method for producing an elastomer composite material by carrying out a mastication step for a rubber coagulated matter obtained after a dehydrating step while applying a mechanical energy of at least about 0.3 MJ/kg (about 249 W/kg) and continuously carrying out an additional mastication step while applying a mechanical energy of about 0.9 MJ/kg (about 83 W/kg) (refer to, for example, a patent document 4).

However, the producing method of the patent document 3 described above involves the problem that since the rubber wet master batch is produced by drying and kneading the filler-containing rubber coagulated matter by means of the biaxial extruder, a mechanical energy applied to the rubber wet master batch is increased and that the rubber component is likely to be deteriorated.

Also, the problem that a mechanical energy applied to the rubber wet master batch is increased as well in the producing method of the patent document 4 described above and tends to deteriorate the rubber component.

RELATED ART DOCUMENTS

Patent Documents

Patent document 1: JP-A 2004-99625 (claims, examples and the like)
Patent document 2: JP-A 2009-41026 (claims, examples and the like)
Patent document 3: JP-A 2010-65126 (claims, examples and the like)
Patent document 4: JP-A 2011-511148 (claims, examples and the like)

SUMMARY OF THE INVENTION

Problems to be Solved by the Invention

In the light of the problems on the conventional technologies described above ad the existing situation, the present invention tries to solve them, and an object thereof is to provide a method for producing a mixture such as a wet master batch containing carbon black in which the dispersion of a filler such as carbon black and the like can be enhanced to a large extent without reducing the physical properties of a rubber component.

Intense researches repeated by the present inventors in order to solve the conventional problems described above have resulted in finding that a mixture such as a wet master batch containing carbon black which meets the object described above, and a method for producing a mixture which is suited to producing a rubber composition by using the above mixture are obtained by a method for producing a mixture, comprising a mixing step for mixing a slurry prepared by dispersing a filler containing carbon black with a rubber liquid prepared by dispersing or dissolving a rubber component, wherein carbon black having specific physical properties is used, and a specific mixing equipment and a specific mixing method are employed for a mixing equipment used in the mixing step described above. Thus, they have come to complete the present invention.

That is, the present invention resides in the following items (1) to (3).

(1) A method for producing a mixture, comprising a mixing step for mixing a slurry prepared by dispersing a filler containing carbon black and a rubber liquid prepared by dispersing or dissolving a rubber component, wherein the carbon black contained in the slurry prepared by dispersing the filler containing carbon black has a surface average acidic functional group amount ($\mu$eq/m$^2$) of 0.40 or more and less than 3.00; a pH of the slurry is 8 or more; the sum total of the solid matter concentrations of the slurry prepared by dispersing the filler containing carbon black and the rubber liquid prepared by dispersing or dissolving the rubber component is 20% by mass or less; a mixing equipment used in the mixing step has one or plural rotors disposed rotatably in a rotation axis direction and one or plural stators disposed unrotatably in the rotation axis direction; the rotors and the stators have plural projections which are arranged circularly with the rotation axis set as the center; rings are formed concentrically by the projections in a single stage or a multistage; the projections of the rotors and the stators are oppositely disposed so that they engage alternately; and the slurry and the rubber liquid in which the sum total of the solid matter concentrations thereof is 20% by mass or less are allowed to pass through a space between the rotors and the stators while the rotors rotate, whereby the mixing step is carried out.

(2) The method for producing a mixture as described in the above item (1), wherein a peripheral speed of the rotors in the mixing is 3 to 16 m/second.

(3) The method for producing a mixture as described in the above item (1) or (2), wherein the mixture produced in the mixing step passes through a coagulating step in which the mixture produced in the mixing step is continuously coagulated by means of a static mixer.

According to the present invention, provided is a method for producing a mixture such as a wet master batch containing carbon black in which a dispersibility of a filler such as carbon black and the like can be enhanced to a large extent without reducing or deteriorating the physical properties of a rubber component.

Also, controlling a peripheral speed of the rotors to 3 to 16 m/second in the mixing step makes it possible to carry out efficiently mixing and dispersing and further enhance a dispersibility of a filler such as carbon black and the like to a large extent.

Further, allowing the mixture produced in the mixing step described above to pass through the coagulating step in which the mixture is continuously coagulated by means of the static mixer makes it possible to prepare the raw material (slurry and rubber liquid), enhance a dispersibility of the filler such as carbon black and the like to a large extent and continuously coagulate the mixture at a good efficiency.

BRIEF DESCRIPTION OF THE DRAWINGS

FIGS. 1(a) and 1(b) are schematic drawings showing one example of the mixing equipment used in the method for producing a mixture according to the present invention, wherein FIG. 1(a) is a front view, and FIG. 1(b) is a partial perspective view showing a principal part of a mixing part in a perspective view mode.

DESCRIPTION OF THE PREFERRED EMBODIMENTS

The embodiment of the present invention shall specifically be explained below.

The method for producing a mixture according to the present invention is characterized by a method for producing a mixture, comprising a mixing step for mixing a slurry prepared by dispersing a filler containing carbon black and a rubber liquid prepared by dispersing or dissolving a rubber component, wherein the carbon black contained in the slurry prepared by dispersing the filler containing carbon black has a surface average acidic functional group amount ($\mu$eq/m$^2$) of 0.40 or more and less than 3.00; a pH of the slurry is 8 or more; the sum total of the solid matter concentrations of the slurry prepared by dispersing the filler containing carbon black and the rubber liquid prepared by dispersing or dissolving the rubber component is 20% by mass or less; a mixing equipment used in the mixing step has one or plural rotors disposed rotatably in a rotation axis direction and one or plural stators disposed unrotatably in the rotation axis direction; the rotors and the stators described above have plural projections which are arranged circularly with the rotation axis set as the center; rings are formed concentrically by the projections in a single stage or a multistage; the projections of the rotors and the stators are oppositely disposed so that they engage alternately; and the slurry and the rubber liquid in which the sum total of the solid matter concentrations thereof is 20% by mass or less are allowed to pass through a space between the rotors and the stators while the rotors rotate, whereby the mixing step is carried out.

Figure 1A:
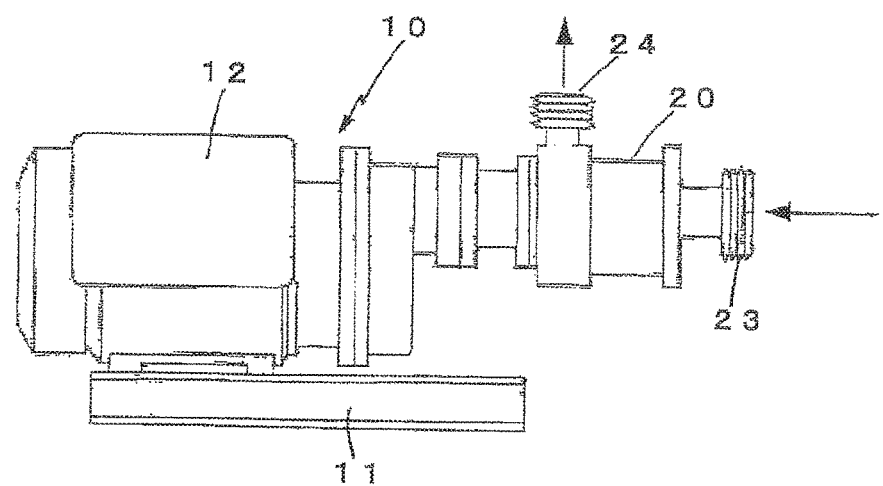
Figure 1B:
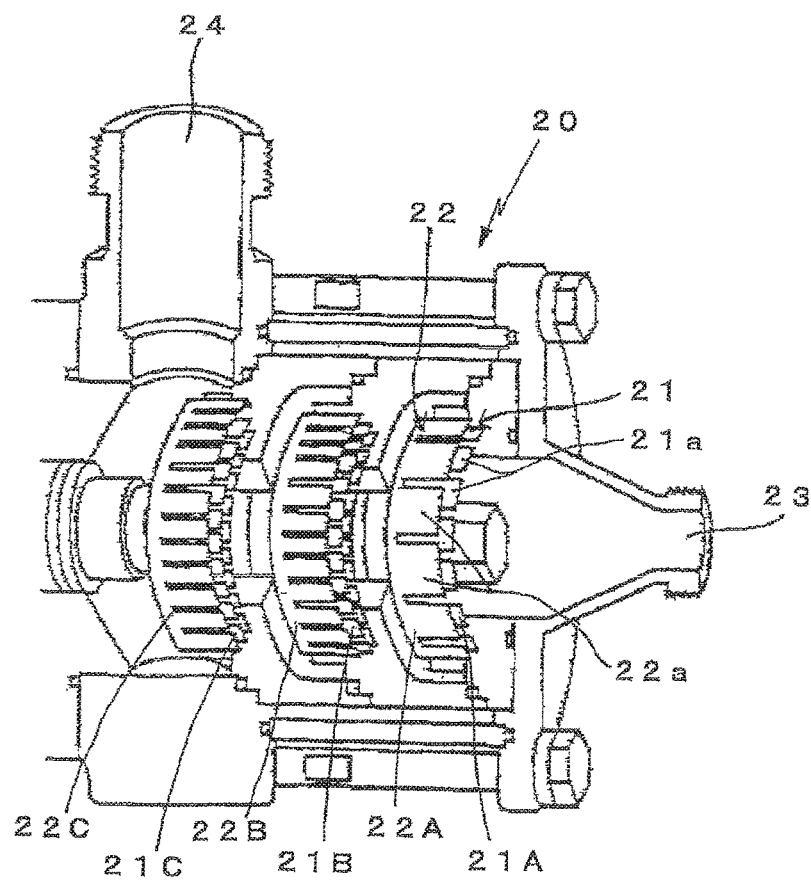
Figure 2:
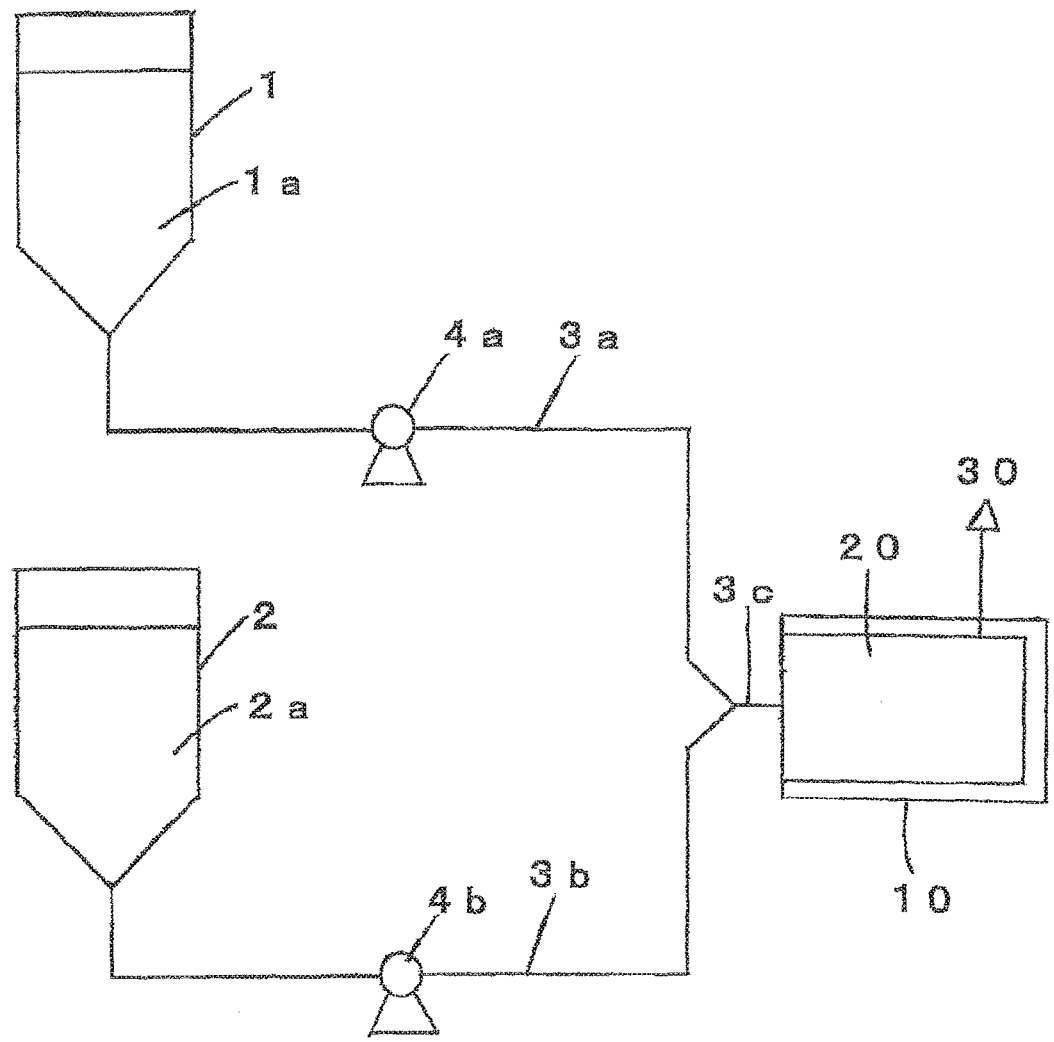
FIG. 2 is a process drawing showing one example of the method for producing a mixture according to the present invention.

FIG. 1(a), FIG. 1(b) and FIG. 2 are drawings showing the examples of the mixing equipment used in the method for producing a mixture according to the present invention, and the process drawing thereof. One example of the embodiment thereof shall be described below in detail with reference to a case in which the above mixing equipment is used as an example while referring to the drawings.

Given as a mixing equipment which can be used is, for example, a mixing equipment 10 equipped with, as shown in FIG. 1 (a), at least a mechanical part 12 and a mixing part 20 on a base 11, wherein the mechanical part 12 is provided with a driving mechanism such as a motor used for mixing and dispersing in the mixing part 20.

In the present embodiment, the mixture is produced according to, for example, the process drawing (flow) shown in FIG. 2. Provided are, as shown in FIG. 1(a) and FIG. 2, a slurry preparing bath 1 for preparing a slurry by dispersing a filler containing carbon black and a rubber liquid preparing bath 2 for preparing a rubber liquid by dispersing or dissolving a rubber component, and a slurry 1a and a rubber liquid 2a which are prepared in the respective preparing baths 1 and 2 described above are supplied to the mixing equipment 10 via lines 3a, 3b and pumps 4a, 4b through a mixed liquid line 3c. The slurry 1a prepared by dispersing the filler containing carbon black and the rubber liquid 2a prepared by dispersing or dissolving the rubber component are mixed and dispersed in the mixing part 20 of the mixing equipment 10, whereby a mixture 30 is produced. A flow regulation valve, a pressure gauge and the like are provided, though not illustrated, on the lines 3a, 3b. Also, a master batch is obtained from the mixture 30 obtained in the mixing equipment 10, as described later, passing through a coagulating step (continuous coagulating step) and a DRY step (solid-liquid separation, drying).

The slurry 1a prepared by dispersing the filler containing the carbon black used is a slurry solution in which an inorganic filler and the like such as carbon black and silica is dispersed in water, and it can be prepared by putting the filler containing a prescribed amount of the carbon black having the following characteristic and water in the preparing bath 1 and the like and stirring them for a fixed time by means of a kneader such as a homo mixer.

The carbon black used in the step for producing the above slurry solution has a surface average acidic functional group amount (μeq/m$^2$) of 0.40 or more and less than 3.00.

Controlling the above surface average acidic functional group amount to 0.40 or more makes it possible to narrow a particle diameter distribution of the slurry solution, and controlling the surface average acidic functional group amount to less than 3.00 more makes it possible to maintain the reinforcing property with the polymer (rubber) to a high extent. The carbon black having a surface average acidic functional group amount of less than 0.40 cannot exert the effects of the present invention.

The carbon black has a surface average acidic functional group amount of more preferably 0.40 or more and 2.00 or less, further preferably 0.4 or more and 1.5 or less from the viewpoints of narrowing a particle diameter distribution of the slurry solution and preventing a reduction in the reinforcing property.

The carbon black provide with the above characteristic is enhanced in an affinity with water by introducing an acidic functional group onto a surface to thereby make it possible to narrow a particle diameter distribution of the slurry solution.

A method for determining the acidic functional group amount includes, for example, the following method proposed by Boehm et al.

Method Proposed by Boehm et al:

Carbon black 10 g and a $C_2H_5ONa$ aqueous solution 50 g of 0.01 mol/L are stirred for 2 hours in a flask and then left standing still for 22 hours at room temperature. After left standing still, the mixture is further stirred for 30 minutes and then filtrated to recover the filtrate. The filtrate 25 ml recovered is subjected to neutralization titration with a HCl aqueous solution of 0.01 mol/L to determine an amount (ml) of the HCl aqueous solution required until the pH reaches 4.0. The surface average acidic functional group amount (miliequivalent/kg) is calculated from the amount of the HCl aqueous solution and the following equation (I):

$$\text{acidic functional group amount} = (25 - \text{HCl aqueous solution amount}) \times 2 \quad \text{(I)}$$

In the present invention (including examples and the like described later), the surface average acidic functional group amount is a value obtained by dividing the acidic functional group amount determined by the method described above with a nitrogen adsorption specific surface area, and it is shown by an equivalent per a unit area (μeq/m$^2$).

Nitrogen Adsorption Specific Surface Area:

The nitrogen adsorption specific surface area is measured according to JIS K 6217 (1997).

The carbon black having the characteristic described above has preferably a dibutyl phthalate oil absorption (DBP oil absorption) (ml/100 g) of 100 or less from the viewpoint that the carbon black is liable to become fine due to an influence exerted by the effects of the colloidal characteristic and the surface acidic functional group.

Also, the carbon black having the characteristic described above has a statistical thickness surface area (STSA) (m$^2$/g) of preferably 30 or more and 300 or less from the viewpoint of the rubber reinforcing property.

When the slurry solution is produced with carbon black having STSA (m$^2$/g) of 120 or more, the carbon black is liable to be reaggregated if water and the carbon black are mixed earlier, and a slurry atomization frequency cannot sufficiently be secured in a certain case. Accordingly, when the carbon black has an STSA (m$^2$/g) of 120 or more, the carbon black is dispersed preferably in a basic aqueous solution prepared by mixing water and a base.

Use of the basic aqueous solution prepared by mixing water and a base provides the sufficiently high slurry atomization frequency even if the carbon black having an STSA (m$^2$/g) of 120 or more is used. In this respect, the sufficiently high slurry atomization frequency means a frequency in which a dispersibility of the carbon black contained in the master batch is enhanced and in which the rubber property (abrasion resistance index) is improved and means that the carbon black having a slurry atomization frequency of 1 μm or less in the slurry solution accounts for 65% or more. In a case where water and the carbon black are mixed earlier and where the base is added later, the slurry atomization frequency of 1 μm or less in the slurry solution cannot sufficiently be secured in a certain case.

The base used for the basic aqueous solution described above suitably includes, for example, sodium hydroxide, ammonia and the like.

An amount of the base added to the basic aqueous solution is preferably 0.06% by mass or more and 0.1% by mass or less, more preferably 0.08% by mass or more and 0.1% by mass or less and further preferably 0.08% by mass or more and 0.09% by mass or less based on a whole amount of the slurry solution from the viewpoints of securing the slurry atomization frequency and enhancing the rubber properties of the master batch.

Carbon blacks for color can be used as the carbon black used in the step for producing the slurry solution. Further, carbon blacks of various grades such as, for example, SAF, HAF, ISAF, FEF, GPF and the like can be used as the carbon black alone or in a mixture of two or more kinds thereof.

The silica which can be used shall not specifically be restricted, and wet silica, dry silica, colloidal silica and the like can be used.

In a stage of slurrying the carbon black in which an acidic functional group is introduced, preferably employed is a method in which sodium hydroxide and the like are added to make the pH 8 or more to ionize the acidic functional group in order to stably hold the pulverized carbon black. If the pH is less than 8, the carbon black in which an acidic functional group is introduced is aggregated, and therefore it is not preferred. A pH of the slurry solution is preferably 9 or more from the viewpoint of stably holding the pulverized carbon black.

A method for introducing an acidic functional group shall not specifically be restricted and includes liquid phase oxidation treatment, gas phase oxidation treatment and the like, and it is carried out preferably by gas phase ozone treatment. The gas phase ozone treatment is lower in a cost than the liquid phase oxidation treatment and makes it possible to efficiently introduce a carboxyl group. The gas phase oxidation treatment means that dry carbon black is brought into contact with an ozone gas for oxidation. Gas phase ozone-treated carbon black includes, for example, SBX45 manufactured by Asahi carbon Co., Ltd.

Carbon black is subjected preferably to oxidation treatment by exposing dried carbon black to an ozone atmosphere of 0.1% or more and 16% or less. A treatment temperature in the oxidation treatment of the carbon black under an ozone atmosphere is room temperature to 100° C., and a treatment time is 10 to 300 seconds. The above oxidation treatment of the carbon black is a method for oxidizing the dried carbon black directly with an ozone gas, and therefore it does not indispensably require after-treatment (washing and drying) and is efficient, simple and cost-saving.

In the present invention, the slurry prepared by dispersing the filler containing the carbon black having the characteristic described above is prepared preferably by dispersing a filler such as carbon black under the absence of a dispersant. A dispersant may be added in order to stably disperse the carbon black and the like, but in the case of, for example, the foregoing carbon black in which an acidic functional group is introduced, the gas phase ozone-treated carbon black is preferably used without adding the dispersant. Use of no dispersant prevents the rubber product produced by using the wet master batch as a material from being concerned about a reduction in a fracture strength and makes it possible to reduce the manufacturing cost.

In this connection, the "dispersant" is referred to as a surfactant and a resin added for the purpose of dispersing the carbon black stably in the carbon black slurry. It includes, to be specific, anionic polymers such as polyacrylic acid salts, salts of styrene-acrylic acid copolymers, salts of vinylnaphthalene-acrylic acid copolymers, salts of styrene-maleic acid copolymers, salts of vinylnaphthalene-maleic acid copolymers, sodium salts of β-naphthalenesulfonic acid formalin condensates, polyphosphoric acid salts, and the like, nonionic polymers such as polyvinyl alcohol, polyvinylpyrrolidone, polyethylene glycol and the like, proteins such as gelatin, albumin, casein and the like, water-soluble natural rubbers such as gum arabic, tragacanth gum and the like, glucosides such as saponin and the like, cellulose derivatives such as methylcellulose, carboxymethylcellulose, hydroxymethylcellulose and the like, and natural polymer such as lignosulfonic acid salts, ceramics and the like.

A high shear mixer of a rotor stator type, a high pressure homogenizer, a supersonic homogenizer, a colloid mill and the like are used for producing the aqueous dispersion slurry solution of carbon black. A colloid mill is charged with, for example, a prescribed amount of a filler, to be specific, a filler selected from carbon blacks of various grades such as SAF, HAF, ISAF, FEF, GPF and the like, carbon blacks having a surface average acidic functional group amount (μeq/$m^2$) of 0.40 or more and less than 3.00, silica, and water to stir the mixture at a high speed for a fixed time, whereby the above slurry solution can be prepared.

A particle size distribution of the carbon black contained in the aqueous dispersion slurry solution is preferably 1.0 μm or less in terms of a 90 volume % particle diameter (D90) as a volume average particle diameter. It is more preferably 0.5 μm or less in terms of a 90 volume % particle diameter (D90) as a volume average particle diameter.

If the carbon black used has a too large particle diameter, the carbon black is deteriorated in dispersion in the rubber to worsen the reinforcing property and the abrasion resistance in a certain case.

On the other hand, if an excessive shearing force is applied to the slurry in order to decrease a particle size of the carbon black, the structure of the carbon black is broken to reduce the reinforcing property in a certain case. From the above viewpoint, a DBP oil absorption of the filler obtained by drying the filler recovered from the aqueous dispersion slurry solution accounts for more preferably 93% or more, further preferably 96% or more based on that of the carbon black before added to the slurry.

In the present invention, the rubber liquid 2a prepared by dispersing or dissolving the rubber component used in the step for producing the mixture includes, for example, a natural rubber latex and/or a synthetic rubber latex, organic solvent solutions of synthetic rubbers obtained by solution polymerization, and the like. Among them, rubber solutions comprising a natural rubber latex and/or a synthetic rubber latex are suited from the viewpoints of the performances of the wet master batch and easier production thereof.

The natural rubber latex includes a field latex, an ammonia-treated latex, a centrifugally concentrated latex, a deproteinized latex treated with an enzyme, those obtained by combining the compounds described above, and any ones thereof can be used.

Lattices of styrene-butadiene copolymer rubbers, synthetic polyisoprene rubbers, polybutadiene rubbers, nitrile rubbers, polychloroprene rubbers, and the like can be used as the synthetic rubber latex.

The dispersion of the rubber liquids described above can be regulated by carrying out it for a prescribed time by means of a mixer such as a homo mixer.

In the mixing step for mixing the slurry solution prepared by dispersing the filler containing the carbon black and the rubber liquid prepared by dispersing or dissolving the rubber component in the present invention, they can be mixed and dispersed by means of, for example, the mixing equipment 10 shown in FIGS. 1(a) and 1(b).

For example, the slurry solution prepared by dispersing the filler containing the carbon black pre-dispersed and the rubber liquid prepared by dispersing or dissolving the rubber component are supplied to the disperser (Milder, manufactured by Matsubo Corporation) shown in FIG. 1(a) and FIG. 1(b) which is used as the mixing equipment at an inlet velocity (transport amount) of 10 to 1000 L/minute, preferably 80 to 500 L/minute by means of a transport means such as a pump usually used. In this connection, the inlet velocity is controlled preferably so that a mass ratio of the slurry solution to the rubber liquid is (80:20) to (20:80).

The mixing part 20 in the mixing equipment 10 has, as shown in FIG. 1 (b), one or plural rotors 21 (21A, 21B, 21C) disposed rotatably in a rotation axis direction and one or plural stators 22 (22A, 22B, 22C) disposed unrotatably in the rotation axis direction; the rotors 21 and the stators 22 have plural projections (comb teeth) 21a - - -, 22a - - - which are arranged circularly with the rotation axis set as the center; and rings are formed concentrically by the projections (comb teeth) 21a - - -, 22a - - - in a single stage or a multistage.

The slurry prepared by dispersing the filler containing the carbon black and the rubber liquid prepared by dispersing or dissolving the rubber component are allowed to pass through the respective spaces between the rotors 22 (22A, 22B, 22C) and the stators 22 (22A, 22B, 22C) while the rotors 21 (21A, 21B, 21C) described above rotate, whereby the mixing is carried out, that is, the carbon black particles and the rubber particles in the slurry solution and the rubber liquid fall into a state in which they are sufficiently mixed and dispersed by applying a thorough shearing force. The term "rings are formed concentrically in a single stage or a multistage" described above means that the rings are formed concentrically in the respective rotors and stators by the projections (comb teeth) in a single stage or a multistage (two stages, three stages, four stages - - - ) so that they engage alternately.

An outermost peripheral speed of the rotors 21 (21A, 21B, 21C) in the mixing equipment 10 is preferably 3 to 16 m/second from the viewpoint of exerting efficiently the effects of the present invention.

Also, a mixing time (retention time) in the mixing equipment 10 described above is varied according to the solid matter concentrations and the flow amounts of the slurry and the rubber liquid mixed, the structure (the number of the rotors and the stators, the number and the clearance of the projections and the stages, a revolution number of the rotors, and the like) of the emulsifying disperser, and the suitable mixing processing time (retention time) is set from the viewpoint of exerting sufficient dispersion and shearing action. The mixing processing time (retention time) in the above mixing equipment 10 is determined by dividing a mixing space volume of the rotors and the stators such as a clearance, a space and the like by an inlet velocity of the slurry and the rubber liquid treated. For example, assuming that an inlet velocity of the slurry and the rubber liquid is 200 L/minute and that the mixing space volume is 0.2 L, the mixing processing time is $\frac{1}{1000}$ minute, that is, 0.06 second.

In the present invention, a large shearing force is applied in the mixing equipment 10 used, and therefor when a rubber liquid such as a natural rubber latex including a wet master batch unlike emulsions prepared in foods and cosmetics, and toner compositions used in an electrophotography is used, mechanical coagulation proceeds in the mixing part 20 of the mixing equipment 10 to clog it in a certain case. Accordingly, the sum total of the solid matter concentrations of the slurry prepared by dispersing the filler containing carbon black and the rubber liquid prepared by dispersing or dissolving the rubber component is 20% by mass or less, preferably 17% by mass or less and more preferably 5 to 15% by mass based on a whole amount of the slurry and the rubber liquid injected.

If the sum total of the solid matter concentrations described above is 20% by mass or less based on a whole amount of the slurry and the rubber liquid injected, a solid matter concentration of the slurry prepared by dispersing the filler containing the carbon black used and a solid matter concentration of the rubber liquid prepared by dispersing or dissolving the rubber component can suitably be combined in the above range. A solid matter concentration of the slurry prepared by dispersing the filler containing the carbon black is controlled in a range of preferably 3 to 12% from the viewpoint of the slurry viscosity, and a solid matter concentration of the rubber liquid prepared by dispersing or dissolving the rubber component is controlled in a range of preferably 10 to 60%.

Also, a liquid temperature when preparing the mixture is controlled to 5 to 80° C., preferably 5 to 40° C. from the viewpoint of preventing the rubber latex from being coagulated.

In the present invention, the specific slurry prepared by dispersing the filler containing the carbon black having the characteristic described above and the rubber liquid prepared by dispersing or dissolving the rubber component in which the sum total of the solid matter concentrations described above is 20% by mass or less are allowed to pass (pass through the space of the shearing forces) through the spaces between the rotors 21 (21A, 21B, 21C) and the stators 22 (22A, 22B, 22C) which have projections so that they engage alternately while the rotors 21 (21A, 21B, 21C) in the mixing equipment 10 rotate, whereby produced is the mixture such as the wet master batch containing the carbon black which can enhance a dispersibility of the filler such as the carbon black and the like to a large extent without reducing or deteriorating the physical properties of the rubber component.

In the present invention, the wet master batch having an excellent dispersibility can be provided in the stage of the mixing step, and therefore a kneading function does not have, as described later, to be provided in the drying step to make it possible to simplify the steps.

The mixing equipment 10 shown in FIGS. 1(a) and 1(b) is merely one example for carrying out the present invention, and it shall not specifically be restricted as long as the mixing equipment used in the mixing step has one or plural rotors disposed rotatably in a rotation axis direction and one or plural stators disposed unrotatably in the rotation axis direction; the rotors and the stators have plural projections which are arranged circularly with the rotation axis set as the center; rings are formed concentrically by the projections in a single stage or a multistage; the projections of the rotors and the stators are opposed so that they engage alternately; and the slurry and the rubber liquid in which the sum total of the solid matter concentrations thereof is 20% by mass or less are allowed to pass through a space between the rotors and the stators while the rotors rotate, whereby the mixing step is carried out (hereinafter referred to as the mixing equipment having the structure described above). The number of the rotors and the stators, the number of the projections, the number of the stages in which the rings formed by the projections are provided concentrically, the respective stages and the respective clearances of the rotors and the stators, the revolution number and the peripheral velocity of the rotors, and the like can be changed to suited modes, and capable of being used are equipments having structures other than that of the mixing equipment 10 shown in FIGS. 1(a) and 1(b), for example, various dispersers such as a mixing equipment of vertical disposition having the constitution described above (flowing in from upward, mixing and dispersing and then discharging from downward).

The mixture obtained according to the present invention, that is, the mixture obtained by the mixing step described above (WET step: raw material preparing steps (slurry, rubber liquid), a mixing step (continuous dispersion)) is allowed to pass through a coagulating step (WET step), a DRY step (a solid-liquid separation step, a drying step), whereby a wet master batch is obtained.

A coagulant including acids such as formic acid, sulfuric acid and the like and salts such as sodium chloride and the like is used, as is the case with a usual coagulating step, in the coagulating step of the mixture. Also, in the present invention, coagulation is carried out in some cases by mixing the slurry solution and the rubber latex solution described above without adding the coagulant.

A static mixer (continuous coagulating step) is preferably used in the coagulating step of the mixture. That is, at least one or more static mixers are used, and the mixing step and the coagulating step can continuously be carried out by transporting the fixed amounts of the mixture described above and the acid such as formic acid to the above static mixer to make it possible to enhance the production efficiency. Also, allowed to be employed is a method in which plural mixers such as static mixers and general purpose mixers are continuously used to carry out continuous mixing by a divided supplying method for gradually supplying a supply amount of the acid such as formic acid and the like supplied to mixers such as a first static mixer, a second static mixer and a third static mixer in the structure of, for example, continuously supplying in order to three mixers such as static mixers, wherein the coagulant such as formic acid is dividedly supplied to the first mixer by 50 mass %, the second mixer by 75 mass % in total and the third mixer by 100 mass % in total, whereby coagulation is carried out. The coagulated matter can be prevented from being increased in a diameter, and the production efficiency can be further enhanced.

Figure 3:
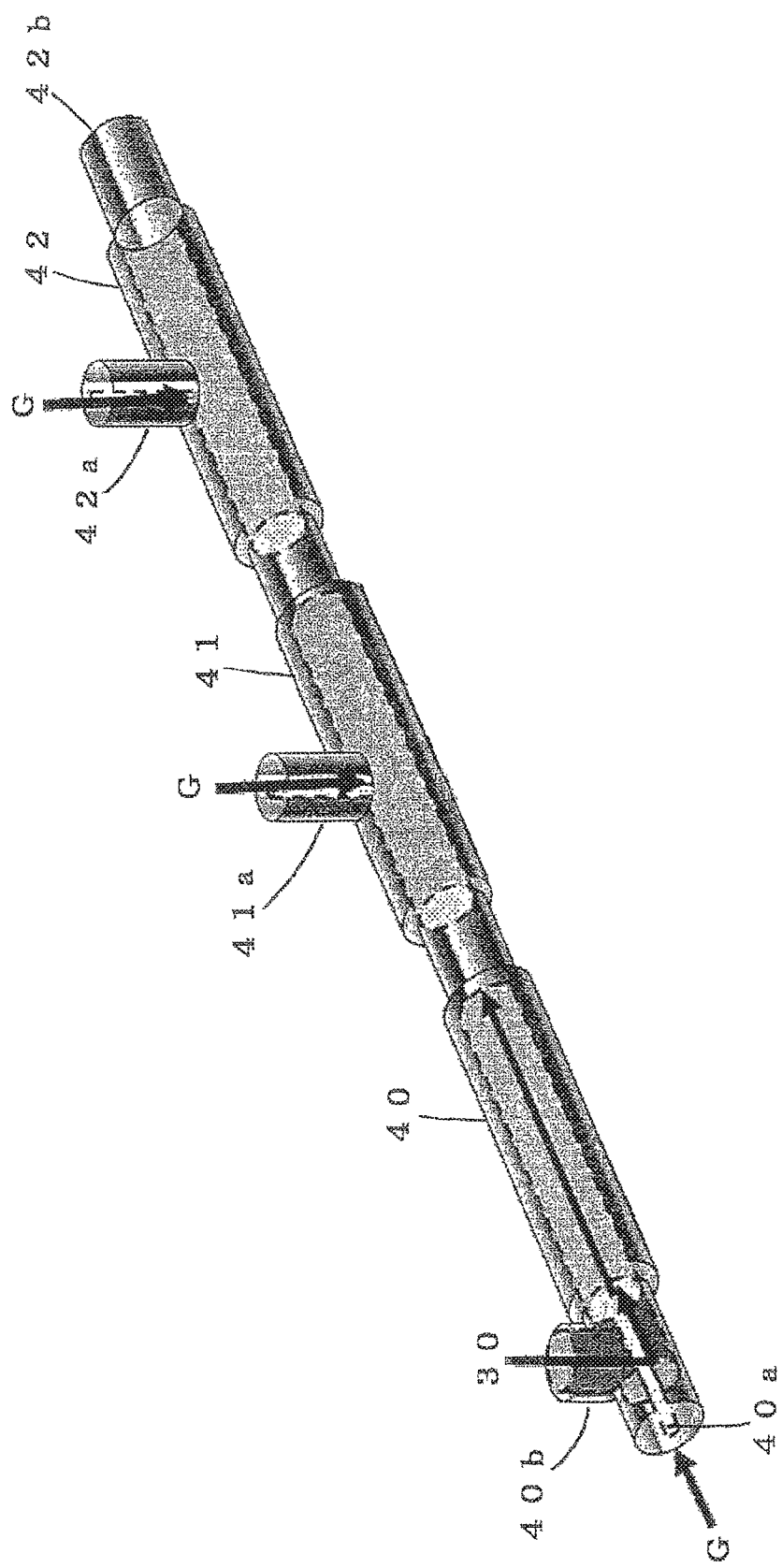
FIG. 3 is a schematic drawing showing one example of the coagulating step in which the mixture produced in the mixing step according to the present invention is continuously coagulated by means of a static mixer.

FIG. 3 is a schematic drawing showing one example of the coagulating step in which the mixture produced in the mixing step described above is continuously coagulated by means of a static mixer.

The static mixer used is a static mixer (line mixer) having no driving part and making use of an injection pressure, and it is called a motionless mixer. In the above static mixer, the liquids are stirred and mixed in order by a fixed element (curved plate). The above static mixer is a general mixer and shall not specifically be restricted in the shape of the elements, the setting number thereof and the like, and capable of being used are, for example, static mixers equipped with various element forms such as a spiral element, a twisted wing-shaped mixing element, a twisted blade-shaped stirrer, a wavy plate and the like. The static mixer which can specifically be used includes, for example, commercially available mixers manufactured by Noritake Co., Ltd., U.S. TAH Inc., U.S. KOFLO Corporation, PRIMIX Corporation.

In the present embodiment, the three static mixers 40, 41, 42 are connected in series, as shown in FIG. 3, to continuously coagulate the mixture (mixed liquid) 30 obtained in the mixing step described above while continuously supplying it. When the mixture (mixed liquid) 30 is introduced (quantitatively delivered) into a carry-in port 40b of the static mixer 40, a coagulant (formic acid) G is charged (quantitatively delivered) from an input port 40a provided in the front part of the static mixer 40 in an amount of 50% by mass based on a whole amount (amount required for controlling the mixture to a prescribed pH) of the coagulant used in the coagulating step. The above mixture 30 and the coagulant G are supplied to the next second static mixer 41 while kneading, and the coagulant (formic acid) G is charged from an input port 41a provided in the central part of the second static mixer 41 in an amount of 25% by mass (total 75% by mass). The above mixture and the coagulant are supplied to the next third static mixer 42 while kneading, and the coagulant (formic acid) G is charged from an input port 42a provided in the central part of the static mixer 42 in an amount of 25% by mass (total 100% by mass: whole amount) to carry out continuous coagulation. The finished coagulated matter is discharged from a discharge port 42b. The coagulated matter discharged is allowed to pass through the next DRY step (a solid-liquid separation step, a drying step), and a wet master batch is obtained.

In the above embodiment, the coagulant (formic acid) G is added in an amount of 50% by mass which is a half of the whole amount in the first static mixer 40 to the mixture 30 obtained in the mixing step described above while kneading. The remaining coagulant (formic acid) G is dividedly added in order to the second static mixer 41 and the third static mixer 42 while kneading to successively carry out coagulation. Accordingly, the coagulated matter is prevented from being increased in a diameter, and the production efficiency in the coagulating step (continuous coagulation of the mixture) can be further enhanced. Further, a mixing and dispersing effect and a coagulation state of the coagulant can be controlled to the suitable states by the connection number of the static mixers, the shape and the setting number of the elements in the respective static mixers, increasing or decreasing the respective divided adding amounts of the coagulant (formic acid) G, and raising or lowering the flow velocity in the static mixers.

Also, in the DRY step for drying the mixture, the coagulated matter obtained by passing through the coagulating step described above can be dried by, for example, subjecting the coagulated matter to solid-liquid separation by a belt filter (vacuum filtration cloth) and then drying it by means of a usual dryer such as an air dryer, a drum dryer, a band dryer and the like, and a uniaxial extrusion dryer. This makes it possible to obtain the rubber which is excellent in a processability, a reinforcing property and rubber physical properties. Such drying can be carried out by means of a usual kneader, but it is carried out preferably by means of a continuous dryer from the viewpoint of the industrial productivity.

The wet master batch obtained by passing through the mixing method described above according to the present invention is excellent in a dispersibility of the filler such as carbon black without reducing or deteriorating the physical properties of the rubber component, and therefore it can suitably be used as a rubber component for a rubber composition in the applications of vibrationproof rubbers, belts, hoses, other industrial products and the like as well as tires.

Various chemicals usually used in the rubber industry, such as a vulcanizing agent, a vulcanization accelerating agent, an antioxidant, a process oil, zinc oxide, a scorch inhibitor, stearic acid, and the like may be added to the rubber composition as long as the applications of the rubber composition and the effects thereof are not damaged.

In the rubber composition, the rubber component in the wet master batch is contained preferably in an amount of 30% by mass or more based on a whole amount of the rubber component. Other rubber components additionally used for the wet master batch described above include usual natural rubbers and diene base synthetic rubbers, and the diene base synthetic rubbers include, for example, styrene-butadiene copolymers (SBR), polybutadiene (BR), polyisoprene (IR), butyl rubber (IIR), ethylene-propylene copolymers and mixtures thereof.

The vulcanizing agent described above includes sulfur and the like, and a use amount thereof is preferably 0.1 part by mass or more and 10.0 parts by mass or less, more preferably 0.5 part by mass or more and 5.0 parts by mass or less based on 100 parts by mass of the rubber component.

The vulcanization accelerating agent used shall not specifically be restricted and includes, for example, vulcanization accelerating agents of a thiazole base such as M (2-mercaptobenzothiazole), DM (dibenzothiazyl disulfide), CZ (N-cyclohexyl-2-benzothiazylsulfenamide), NS (N-t-butyl-2-benzothiazylsulfenamide), and the like, and a guanidine base such as DPG (diphenylguanidine) and the like. A use amount thereof is preferably 0.1 part by mass or more and 5.0 parts by mass or less, more preferably 0.2 part by mass or more and 3.0 parts by mass or less based on 100 parts by mass of the rubber component.

The antioxidant used shall not specifically be restricted and includes, for example, antioxidants of an amine base, a phenol base, an organic phosphite base, a thioether base and the like. A use amount thereof is preferably 0.1 part by mass or more and 5.0 parts by mass or less, more preferably 0.5 part by mass or more and 3.0 parts by mass or less based on 100 parts by mass of the rubber component.

The rubber composition obtained can suitably be used for the applications of vibrationproof rubbers, belts, hoses, other industrial products and the like as well as tires. It is suitably used particularly as a rubber for tires and can be applied to all tire members such as, for example, tread rubbers, side rubbers, ply coating rubbers, bead filler rubbers, belt coating rubbers and the like.

EXAMPLES

Next, the present invention shall be explained in further details with reference to examples and a comparative example, but the present invention shall by no means be restricted to the examples shown below.

Examples 1, 4, and 5 and Comparative Example 1

In Examples 1, 4, and 5, a natural rubber (NR) latex and a carbon black (CB) slurry were mixed by using various conditions, the following method and the mixing equipment based on FIG. 1(a), FIG. 1(b) and FIG. 2, and then the mixture of the natural rubber and the carbon black was coagulated by formic acid to prepare a master batch.

The other prescribed components were added to the master batch prepared to prepare a rubber composition, and the respective rubber compositions were used to evaluate a dispersibility.

Preparation of Carbon Black Slurries in Examples 1, 4, and 5 and Comparative Example 1:

The following carbon black subjected to oxidation treatment was used as carbon black used in Examples 1, 4, and 5 and Comparative Example 1.

Dried carbon black (SB700 manufactured by Asahi Carbon Co., Ltd.) was exposed to ozone environment of 4.5% for oxidation treatment of the carbon black. A treating temperature in the oxidation treatment of the carbon black is 25° C., and a treating time is 30 seconds.

The carbon black subjected to oxidation treatment had a surface average acidic functional group amount of 0.7 ($\mu$eq/m$^2$), a DBP oil absorption of 55 (ml/100 g) and an STSA of 120 (m$^2$/g).

A carbon black slurry in which a 90 volume % particle diameter (D90) of the carbon black in the carbon black slurry was 1 $\mu$m or less was prepared by using each carbon black described above subjected to oxidation treatment, mixing it with a prescribed amount of water (weighed so that a content (solid content) of the carbon black in the slurry was 10% by mass) and a prescribed amount of a sodium hydroxide aqueous solution (weighed so that a content of the sodium hydroxide in the slurry was 0.07% by mass) and subjecting the mixture to dispersion treatment by means of a high shear mixer (BX60 manufactured by Silverson Inc.).

The property (DBP oil absorption (ml/100 g)) of the carbon blacks described above and a DBP oil absorption of the filler were measured based on ISO 6894: 1991. The STSA was measured based on JIS 6217-7: 2013. A 90 volume % particle diameter (D90) of the carbon black in the carbon black slurry was measured was measured by means of Microtrack MT300 manufactured by Nikkiso Co., Ltd. (hereinafter the same shall apply).

Preparation of Rubber Liquid in which a Rubber Component is Dispersed:

The respective rubber liquids comprising a natural rubber (NR) latex and water (refined water) were used. The respective solid contents (Ltx concentration) are shown in the following Table 1.

Examples 1, 4, and 5: Preparation of Coagulated Matter Slurry Prepared from Mixture Obtained The natural rubber latex liquid (rubber liquid) and the carbon black slurry were mixed so that an amount of the respective carbon blacks in Examples 1, 4, and 5 based on 100 parts by mass of the rubber component were 54 parts by mass and 40 parts by mass to prepare dispersions, and they were mixed on various mixing dispersing treatment conditions shown in the following Table 1 [mixing dispersing treatment peripheral velocity (m/s), the shape of the teeth in the rotating part, a surface average acidic functional group amount of the carbon black and a blend amount thereof (part), a (solid) content (Ltx concentration: wt %) of the rubber liquid, a (solid) content and a pH of the carbon black slurry, a (solid) content of the dispersion (the carbon black slurry+the rubber liquid), and a fixed mixing treatment time] by means of a mixing equipment (Milder MDN303V, manufactured by Matsubo Corporation) having the following constitution. The term that the shape of the teeth in the rotating part is one blade in Table 1 means that the ring formed by the projections (comb teeth) is present concentrically in a single stage on each of the rotors and the stators described above, and the term that the shape of the teeth in the rotating part is the three blades means that the rings formed by the projections (comb teeth) are present concentrically in three stages on each of the rotors and the stators described above.

Formic acid was added as the coagulant to the mixed liquid thus obtained while stirring until a pH of the liquid reached about 4.5 to coagulate the mixture of the natural rubber and the carbon black.

A 90 volume % particle diameter (D90) of the coagulated matter in the mixed liquid was measured by means of Microtrack MT300 manufactured by Nikkiso Co., Ltd.

Also, in Examples 1, 4, and 5, problems on the mixing treatment (none: mixing dispersing treatment can be carried out well; clogging: clogging is caused in the coagulation step during or after mixing and dispersing) were confirmed.

Solid-Liquid Separation and Dehydration in Examples 1, 4, and 5:

The coagulated slurry was subjected to solid-liquid separation and dehydration by means of a one filter cloth type dehydration equipment RF300 manufactured by Yanagigawa Engineering Co., Ltd.

Drying in Examples 1, 4, and 5:

The dehydrated solid matter was dried at 60° C. for 3 hours under vacuum to lower a moisture content down to 2% by mass or lower. A moisture content of the solid matter was measured by means of a heating drying type moisture meter MX-50 manufactured by A & D Co., Ltd. All the moisture contents of the respective solid matters obtained in Examples 1, 4, and 5 and Comparative Example 1 described later fell in a range of 1.0 to 2.0% by mass.

Preparation of Rubber Compositions in Examples 1, 4, and 5:

The respective wet master batches obtained on different mixing treatment conditions were used to prepare rubber compositions. In the rubber compositions, blended were 5.2 parts by weight of zinc oxide (No. 1 Zinc Oxide, manufactured by Hakusui Chemical Industry Co., Ltd.), 1.3 part by weight of activated zinc oxide (Activated Zinc Oxide, manufactured by Seido Chemical Industry Co., Ltd.), 0.6 part by weight of an antioxidant (N-phenyl-N'-(1,3-dimethylbutyl)-p-phenylenediamine, NOCRAC 6c, manufactured by Ouchi Shinko Industrial Co., Ltd., 0.3 part by weight of an antioxidant (manufactured by Seiko Chemical Co., Ltd.), 0.2 part by weight of a cobalt boron base adhesive (manufactured by DIC Corporation), 0.03 part by weight of a workability improver (N-cyclohexylthiophtalimide), 0.6 part by weight of a vulcanization accelerator (N,N-dicyclohexyl-2-benzothiazolylsulfenamide), and 3.8 parts by weight of sulfur. The vulcanization condition of the rubber composition was set to 145° C.×90 minutes.

Evaluation of Dispersibility of Wet Master Batch in Examples 1, 4, and 5:

A carbon black dispersion degree (dispagrator×value) was calculated by comparing a sample image with a reference photograph by a method in which a convex part of a rubber cut surface was recognized as a dispersed mass to determine dispersion judgment and dispersed mass particle diameter distribution by means of "αview SR" manufactured by Alpha Technology Co., Ltd. It is shown that the larger the above value is, the more the dispersibility is excellent. The evaluation results thereof are shown in the following Table 1.

Preparation of Rubber Composition in Comparative Example 1

In Comparative Example 1, the latex and the carbon black slurry were stirred for 5 minutes at a peripheral velocity of 2.8 m/second by means of a universal mixer as a mixing means EM25B manufactured by Tsukishima Kikai Co., Ltd. The other operations were carried out in the same manner as in Example 1. The respective evaluation results obtained in Comparative Example 1 are shown in the following Table 1.

|  |  | Examples | | | Comparative Example |
|---|---|---|---|---|---|
|  |  | 1 | 4 | 5 | 1 |
| Mixing and dispersing processing condition | Mixing dispersing treatment peripheral velocity (m/s) | 7.9 | 15.7 | 7.9 | 2.8 |
|  | The shape of the teeth in the rotating part | One blade | One blade | Three blades | — |
|  | A surface average acidic functional group amount of the carbon black (μ eq/m$^2$) | 0.7 | 0.7 | 0.7 | 0.7 |
|  | A blend amount of carbon black | 54 | 54 | 54 | 54 |
|  | Ltx concentration (wt %) | 22 | 22 | 22 | 22 |
|  | Content of the carbon black slurry (wt %) | 5 | 5 | 5 | 5 |
|  | pH of the carbon black slurry | 11.35 | 11.35 | 11.35 | 11.35 |
|  | Content of the dispersion (wt %) | 10 | 10 | 10 | 10 |
| Evaluation | 90% volume % particle diameter in the mixed liquid (D90) (μm) | 30.1 | 40.7 | 30.9 | 28.1 |
|  | Dispersion degree (dispagrator × value) | 8.26 | 8.91 | 8.84 | 7.56 |
|  | Problems of Mixing Processing | None | None | None | None |

As shown in the results in Table 1 described above, it has been found that the mixtures prepared in Examples 1, 4, and 5 falling in the scope of the present invention are suited to the wet master batches containing the carbon black which can improve a dispersibility of the carbon black without reducing or deteriorating the physical properties of the rubber component as compared with the mixtures prepared in Comparative Example 1 falling outside the scope of the present invention.

In contrast with this, to consider the results in Comparative Example 1, a mixing method using a conventional universal mixer was used in Comparative Example 1, and it could be confirmed that the carbon black was inferior in a dispersibility in these cases.

INDUSTRIAL APPLICABILITY

Obtained is a mixture suited to a rubber composition and the like for rubber products such as a wet master batch containing carbon black.

EXPLANATION OF CODES

1a Slurry
2a Rubber liquid
10 Mixing equipment
20 Mixing part
30 Mixture
40, 41, 42 Static mixers

What is claimed is:
1. A method for producing a mixture, comprising a mixing step for mixing a slurry prepared by dispersing a filler containing carbon black and a rubber liquid prepared by dispersing or dissolving a rubber component, wherein the carbon black contained in the slurry prepared by dispersing the filler containing carbon black has a surface average acidic functional group amount ($\mu eq/m^2$) of 0.40 or more and less than 3.00; a pH of the slurry is 8 or more; the sum total of the solid matter concentrations of the slurry prepared by dispersing the filler containing carbon black and the rubber liquid prepared by dispersing or dissolving the rubber component is 20% by mass or less; a mixing equipment used in the mixing step has one or plural rotors disposed rotatably in a rotation axis direction and one or plural stators disposed unrotatably in the rotation axis direction; the rotors and the stators have plural projections which are arranged circularly with the rotation axis set as the center; rings are formed concentrically by the projections in a single stage or a multistage; the projections of the rotors and the stators are oppositely disposed so that they engage alternately; and the slurry and the rubber liquid in which the sum total of the solid matter concentrations thereof is 20% by mass or less are allowed to pass through a space between the rotors and the stators while the rotors rotate, whereby the mixing step is carried out.

2. The method for producing a mixture as described in claim 1, wherein a peripheral speed of the rotors in the mixing step is 3 to 16 m/second.

3. The method for producing a mixture as described in claim 1, wherein the mixture produced in the mixing step passes through a coagulating step in which the mixture produced in the mixing step is continuously coagulated by means of a static mixer.

4. The method for producing a mixture as described in claim 2, wherein the mixture produced in the mixing step passes through a coagulating step in which the mixture produced in the mixing step is continuously coagulated by means of a static mixer.

* * * * *